US009075564B2

(12) United States Patent
Zhao (10) Patent No.: US 9,075,564 B2
(45) Date of Patent: Jul. 7, 2015

(54) ELECTRONIC DEVICE WITH INPUT DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jiang Zhao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 160 days.

(21) Appl. No.: 13/916,586

(22) Filed: Jun. 13, 2013

(65) Prior Publication Data

US 2014/0146456 A1    May 29, 2014

(30) Foreign Application Priority Data

Nov. 28, 2012  (CN) .......................... 2012 1 0492404

(51) Int. Cl.
*G06F 1/16*    (2006.01)
(52) U.S. Cl.
CPC ................ *G06F 1/16* (2013.01); *G06F 1/1667* (2013.01)
(58) Field of Classification Search
CPC ............................. G06F 1/1616; G06F 1/1667

USPC ......................................... 361/679.11, 679.12
See application file for complete search history.

(56) References Cited

U.S. PATENT DOCUMENTS

| 5,168,427 | A  | * | 12/1992 | Clancy et al. ............ 361/679.12 |
| 5,818,360 | A  | * | 10/1998 | Chu et al. ......................... 341/22 |
| 6,175,492 | B1 | * | 1/2001  | Nobuchi .................. 361/679.08 |
| 6,320,743 | B1 | * | 11/2001 | Jin et al. ................... 361/679.08 |
| 6,493,215 | B1 | * | 12/2002 | Chiang et al. ............ 361/679.08 |
| 6,762,931 | B2 | * | 7/2004  | Chen ....................... 361/679.11 |
| 8,446,715 | B2 | * | 5/2013  | Su et al. .................... 361/679.12 |
| 2004/0012918 | A1 | * | 1/2004 | Chen ............................. 361/683 |
| 2005/0083645 | A1 | * | 4/2005 | Moore et al. ................. 361/683 |

* cited by examiner

*Primary Examiner* — Anthony Q Edwards
(74) *Attorney, Agent, or Firm* — Novak Druce Connolly Bove + Quigg LLP (57) ABSTRACT

An electronic device includes a main body, an input device, a latching mechanism, at least one first driving device, and at least one support mechanism. The main body includes a housing defining a recess therein. The input device is rotatably received in the recess and rotatable between a first position where a top surface of the input device is substantially coplanar with a top surface of the housing, and a second position where the input device is inclined with respect to the top surface of the housing. The latching mechanism is configured to latch the input device in the first position. The first driving device is configured to rotate the input device to the second position when the input device is released by the latching mechanism. The support mechanism is configured to support the input device, thereby maintaining the input device in the second position.

19 Claims, 14 Drawing Sheets

ELECTRONIC DEVICE WITH INPUT DEVICE

BACKGROUND

1. Technical Field

This invention relates to an electronic device including an adjustable input device.

2. Description of Related Art

Input devices, such as physical keyboards and touch pads, are often used in electronic devices such as notebook computers. Generally, the input device is fixed on a housing of the electronic device and has a fixed orientation with respect to the housing. Although conventional electronic devices satisfy basic requirement, a new type of electronic device that can be orientated in varied angles with respect to the housing is still needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are described with reference to the accompanying drawings.

Figure 1:
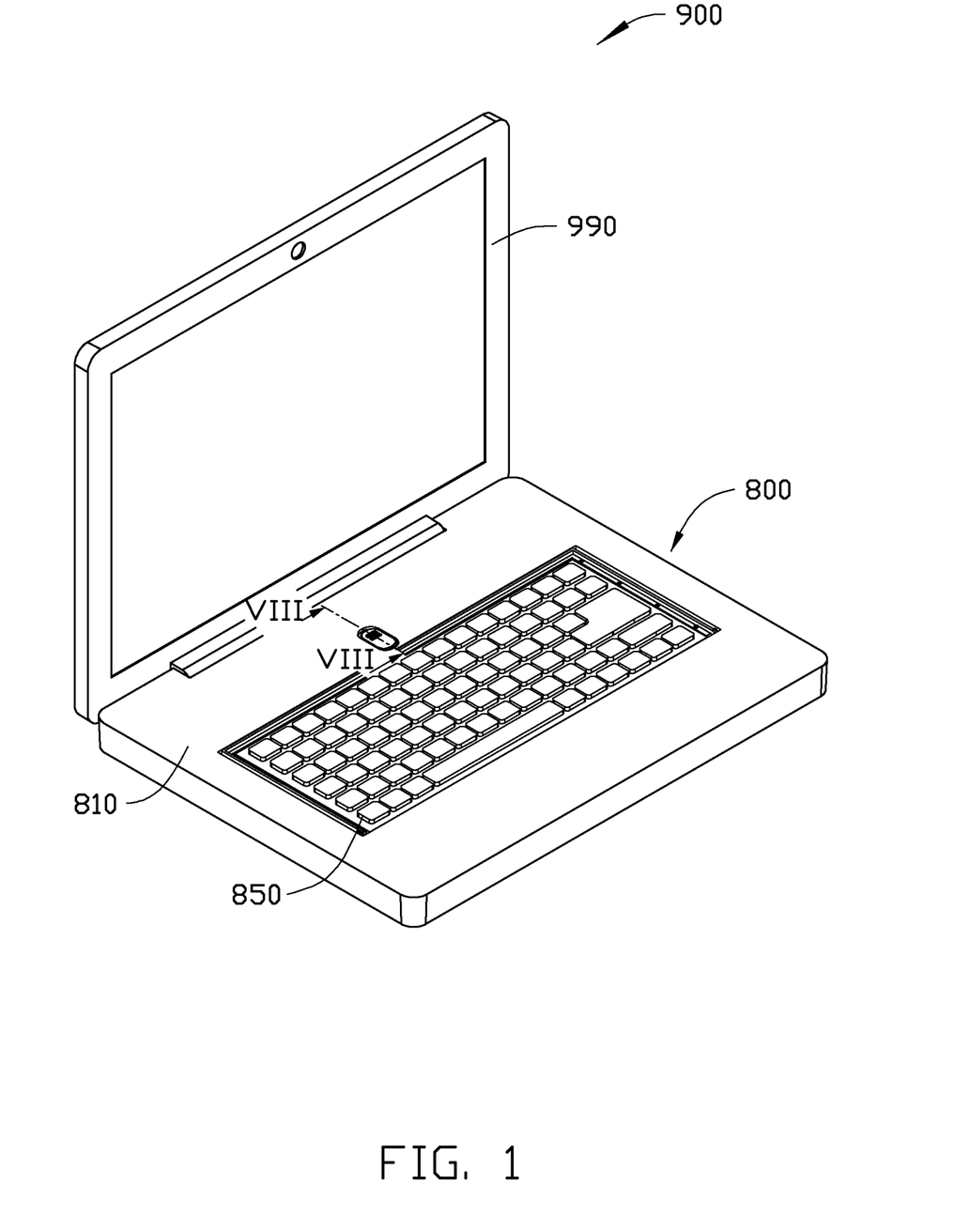
FIG. 1 is an isometric view of an electronic device with a main body and an input device according to an exemplary embodiment.
Figure 2:
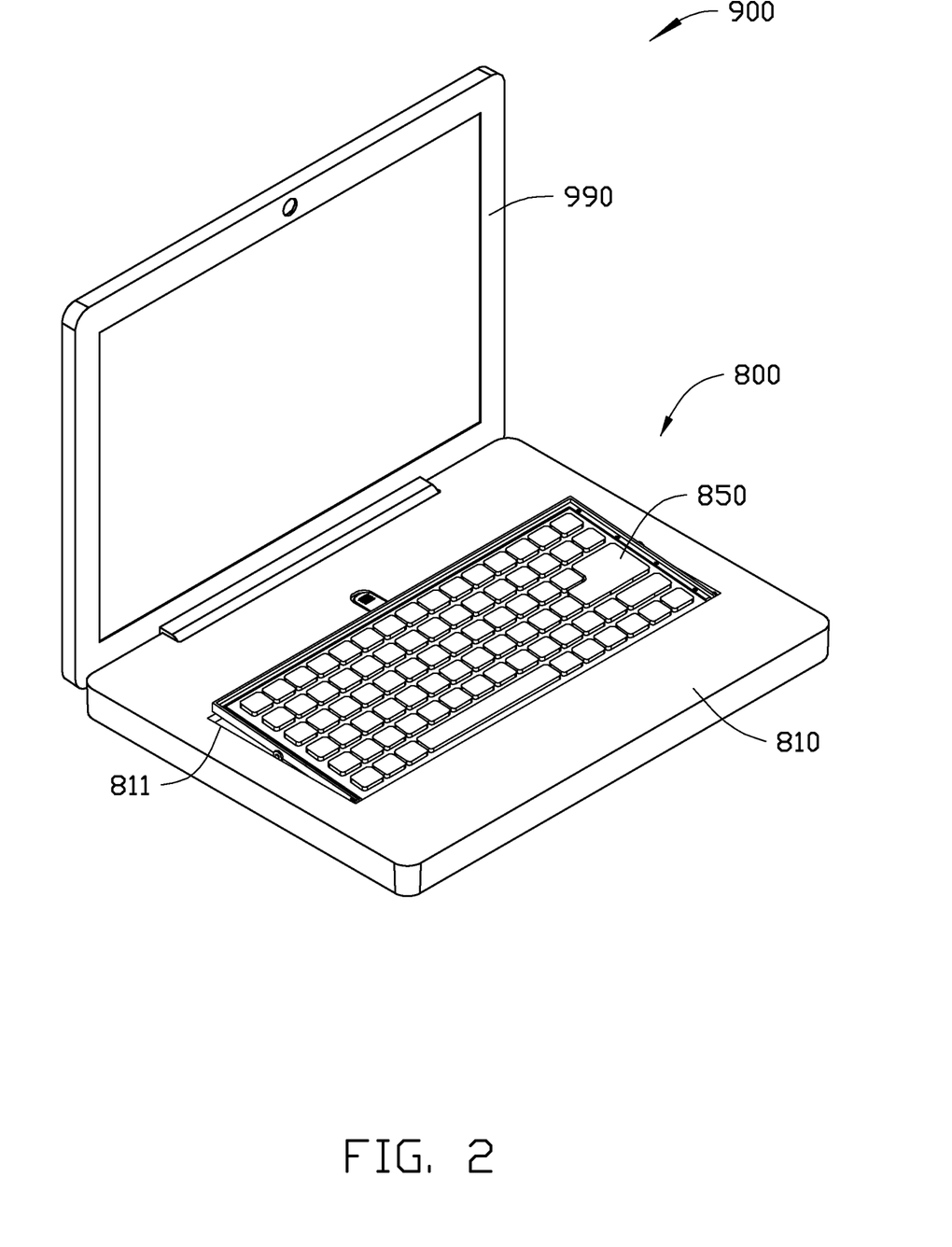
FIG. 2 is similar to FIG. 1, but showing the input device in a different view point.

FIGS. 1-2 show an electronic device 900 according to an exemplary embodiment. The electronic device 900 includes a main body 800, a display 990 pivotally connected to the main body 800, and an input device 850. The main body 800 includes a housing 810 that defines a recess 811 therein. The input device 850 is rotatably received in the recess 811 and rotatable between a first position and a second position. In the first position, as shown in FIG. 1, the input device 850 is entirely received in the recess 811 and a top of the input device 850 is substantially coplanar with the top surface of the housing 810. In the second position, as shown in FIG. 2, the input device 850 is partially received in the recess 811 and is inclined with respect to the top surface of the housing 810.

The input device 850 is electrically connected, via cables or wireless connections, to the components within the housing 810. In the embodiment, the input device 850 is a physical keyboard. In another embodiment, the input device 850 may be a touch pad.

Figure 3:
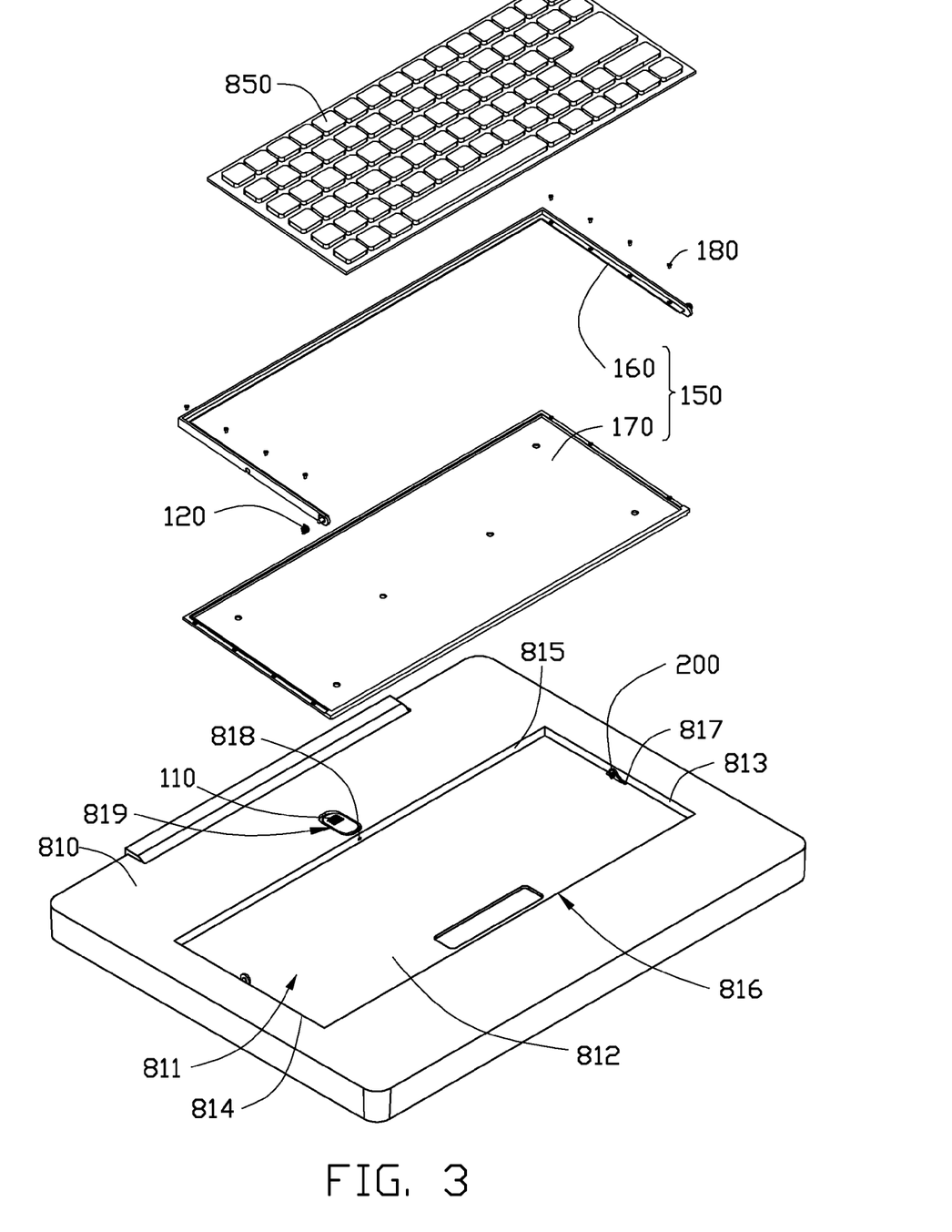
FIG. 3 is an exploded, isometric view of the electronic device of FIG. 1.

Referring to FIG. 3, the recess 811 includes a bottom surface 812, a first sidewall 813, a second sidewall 814, a third sidewall 815, and a fourth sidewall 816 protruding from the bottom surface 812. The bottom surface 812 defines two through slots 817 in opposite sides. The slots 817 extend along a direction parallel to the sidewalls 813 and 814. The second sidewall 814 is substantially parallel to the first sidewall 813, and the third sidewall 815 is substantially parallel to the fourth sidewall 816. The third sidewall 815 defines a through hole 818. The housing 810 further defines a receiving hole 819 adjacent to the third sidewall 815 of the recess 811.

Figure 4:
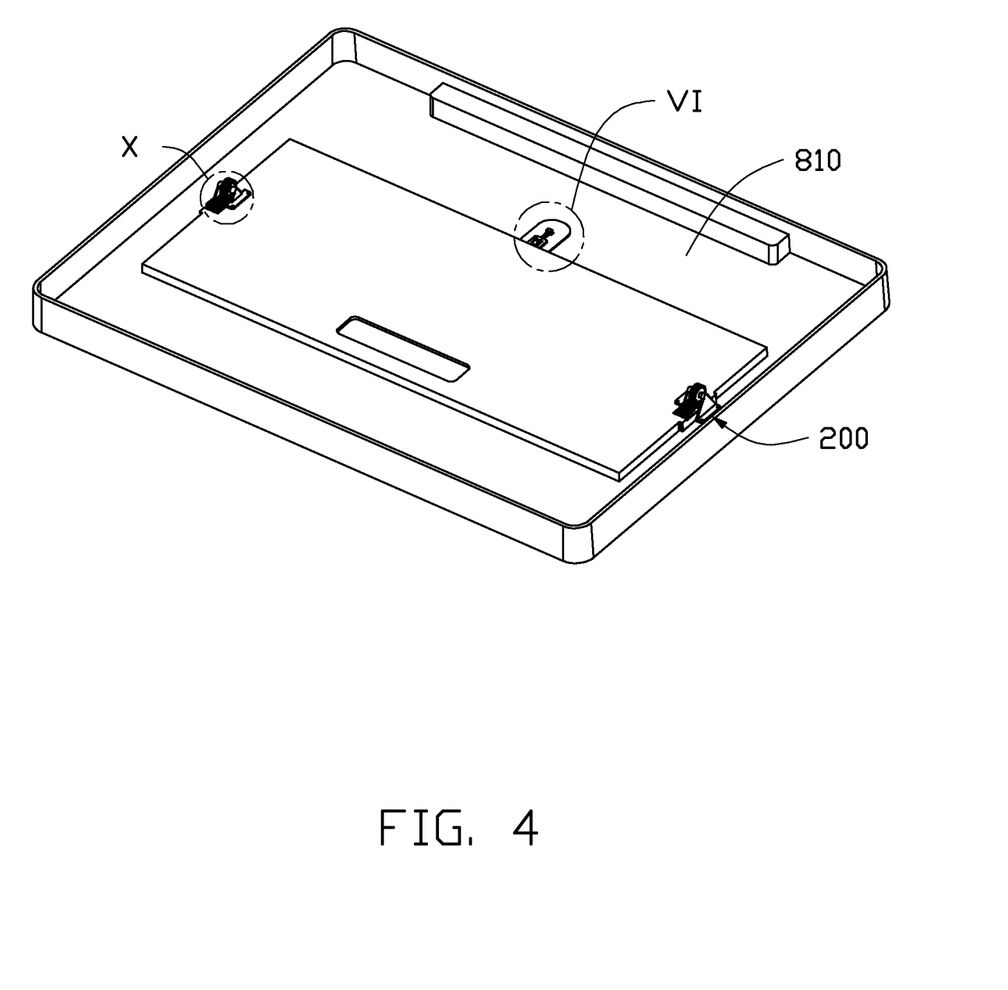
FIG. 4 is an isometric view of the main body of the electronic device in FIG. 1, but viewed from a different view point.

Referring to FIGS. 3 and 4, the electronic device 900 further includes a fixing assembly 150, a latching mechanism 110, a first driving device 120, and two support mechanisms 200.

Figure 5:
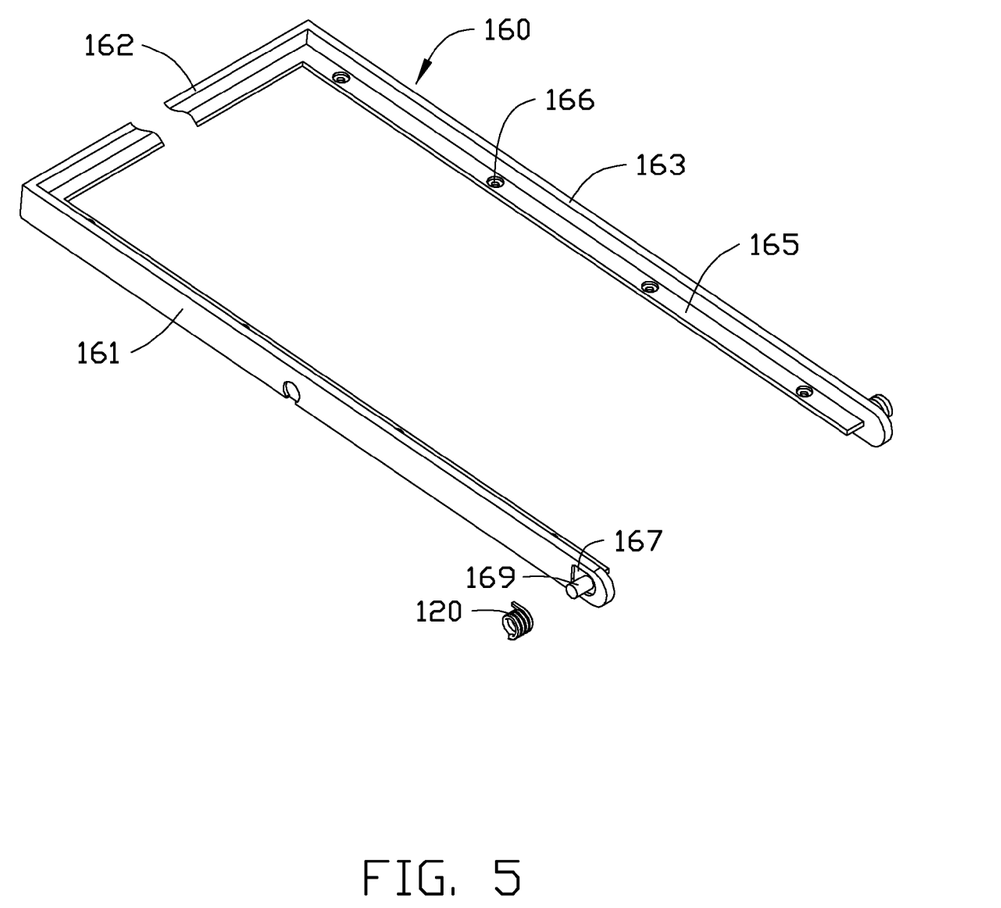
FIG. 5 is an isometric view of a frame of the electronic device of FIG. 1.
Figure 6:
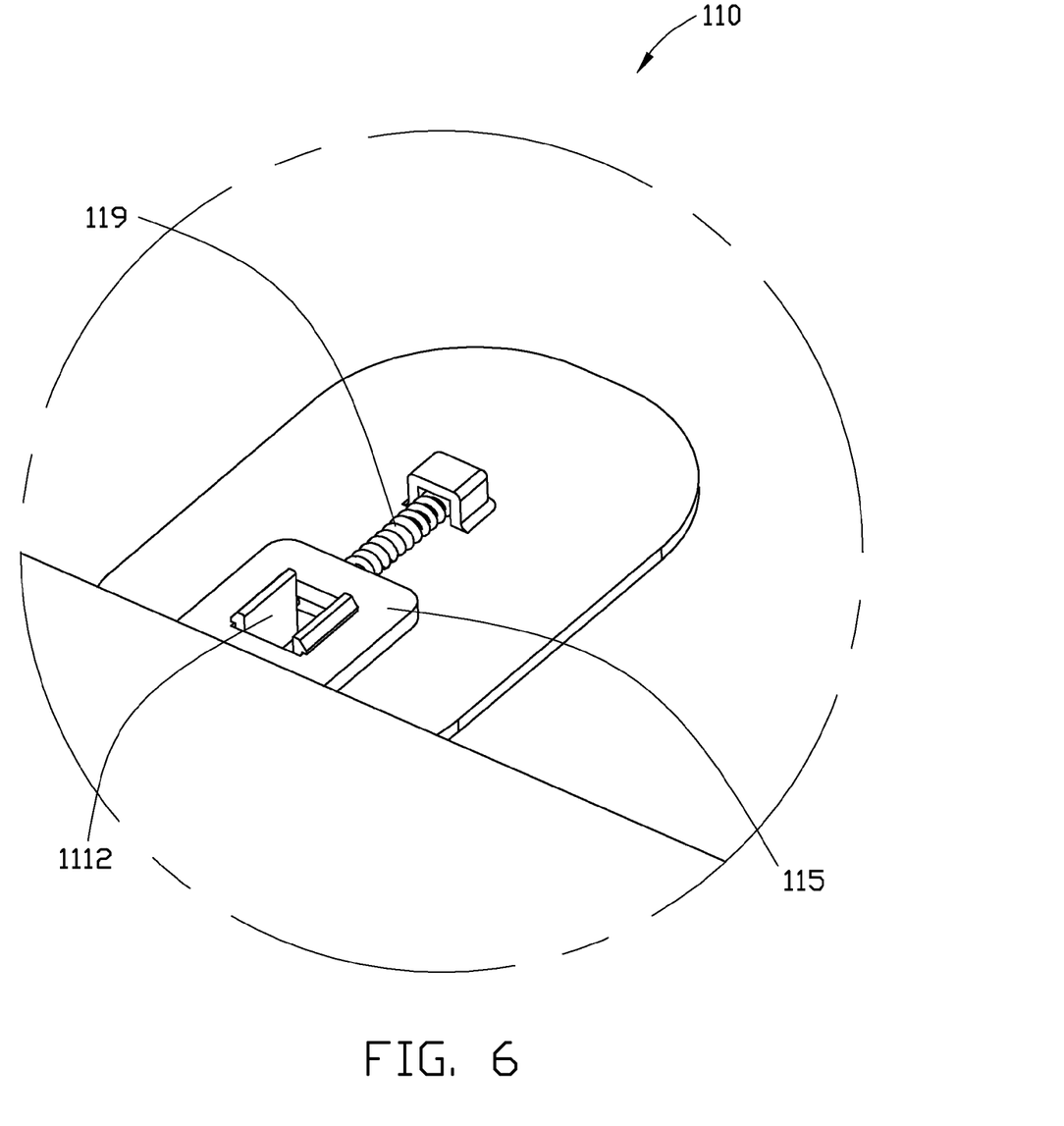
FIG. 6 is an enlarged view of a portion VI of FIG. 4.
Figure 7:
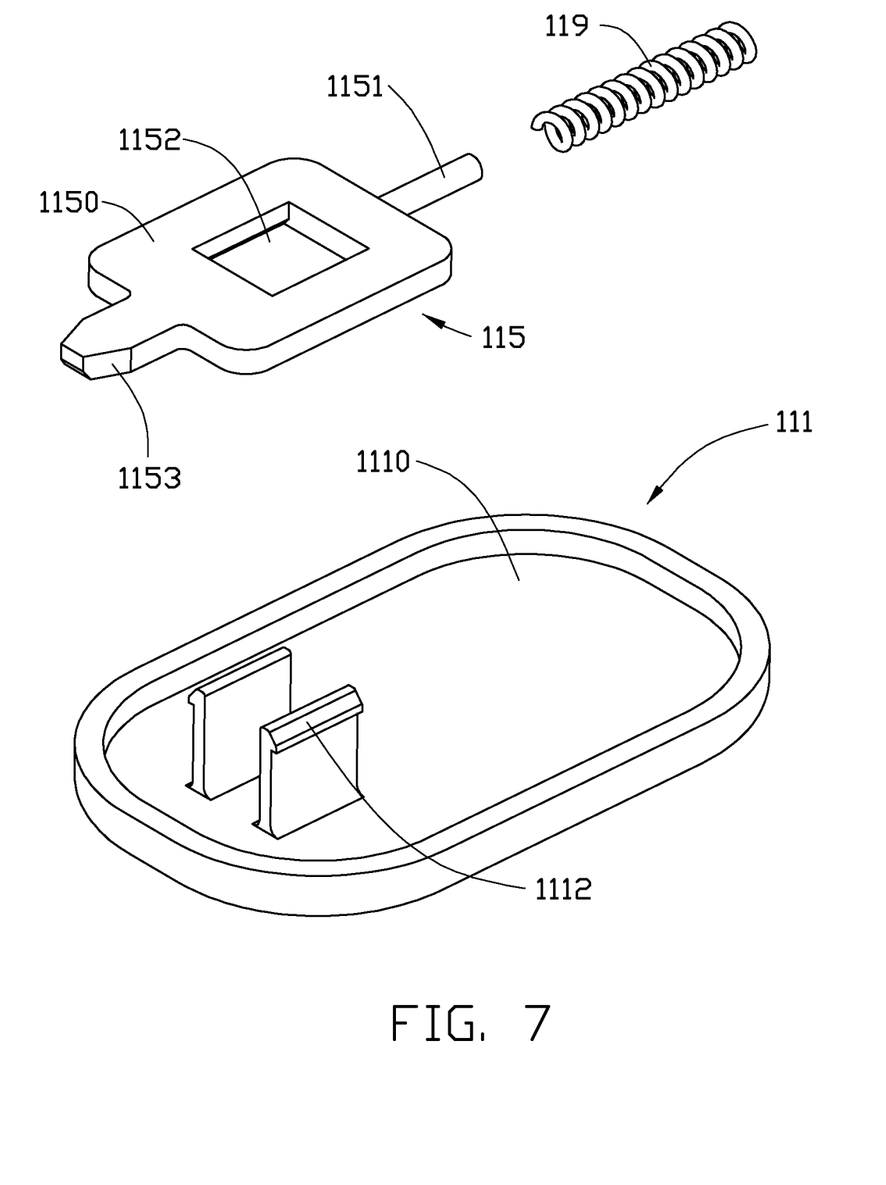
FIG. 7 is an exploded view of a latch mechanism of the electronic device of FIG. 1.

Referring also to FIGS. 3 and 5, the fixing assembly 150 includes a frame 160 and a base plate 170 for supporting the input device 850. The frame 160 includes a first bar 161, a second bar 162 substantially perpendicularly connected to the first bar 161, a third bar 163 substantially perpendicularly connected to the second bar 162, and a ledge 165 protruding from inner sides of the first bar 161, the second bar 162, and the third bar 163. The second bar 162 defines a latching hole 164 (see FIG. 9) in an outer side thereof. When the input device 850 and the fixing assembly 150 are rotated to the first position, the latching hole 164 is substantially aligned with the through hole 818 of the main body 800. The first bar 161 and the third bar 163 each defines a retaining opening 167 in an outer side and includes a first shaft 169 protruding from a bottom of the retaining opening 167. The first shafts 169 are inserted into the first sidewall 813 and the second sidewall 814 of the main body 800, thereby rotatably connecting the fixing assembly 150 to the main body 800.

The ledge 165 defines a number of fastening orifices 166 extending therethrough. A number of fasteners 180 extend through the fastening orifices 166 and are screwed into the base plate 170, thereby securing the frame 160 to the base plate 170.

The first driving device 120 is used to rotate the input device 850 from the first position to the second position. In the embodiment, the first driving device 120 is a torsion spring coiled around the first shafts 169 with opposite ends abutting against the frame 160 and the main body 800.

FIGS. 6-9 show that the latching mechanism 110 includes a button 111, a latching member 115, and a resilient member 119. The button 111 includes a body 1110 movably received in the receiving hole 819 of the main body 800 and two hooks 1112 protruding from the inner side of the body 1110.

The latching member 115 includes a tab 1150 defining an engaging hole 1152 therethrough, a positioning rod 1151 connected to one end of the tab 1150, and a latching portion 1153 projecting from the opposite end of tab 1150. The hooks 1112 extend through a bottom of the receiving hole 819 and detachably engage opposite edges of the engaging hole 1152 of the latching member 115, thereby fixing the latching member 115 to the button 111.

The resilient member 119 is compressed between the latching member 115 and the main body 800. In the embodiment, the main body 800 further includes a stopper protrusion 820 substantially aligned with the positioning rod 1151, and the resilient member 119 is a spring coil coiled around the positioning rod 1151 with opposite ends abutting against the tab 1150 of latching member 115 and the stopper protrusion 820 of the main body 800.

Figure 8:
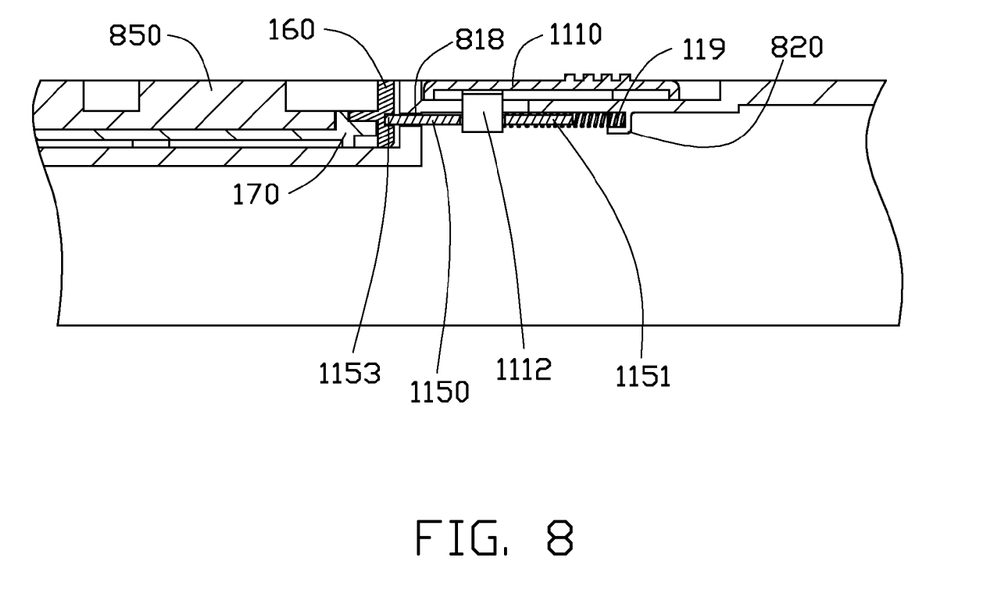
FIGS. 8-9 are cross-section views of the electronic device, taken along line VIII-VIII of FIG. 1.
Figure 9:
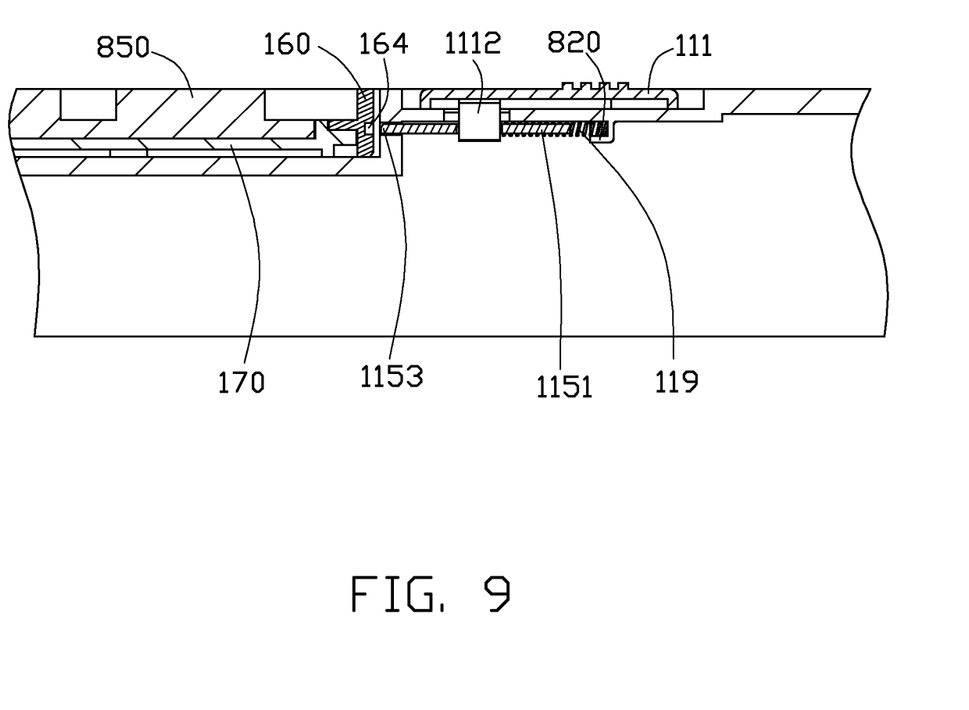

Referring to FIG. 8, one end of the latching portion 1153 is inserted into the latching hole 164 of the frame 160 via the through hole 818, thereby maintaining the input device 850 in the first position. Referring to FIG. 9, when the button 111 is moved in the receiving hole 819, the end of the latching portion 1153 of the latching member 115 can move out of the latching hole 164, thereby allowing the second bar 162 of the frame 16 to rotate with respect to the main body 800.

Figure 10:
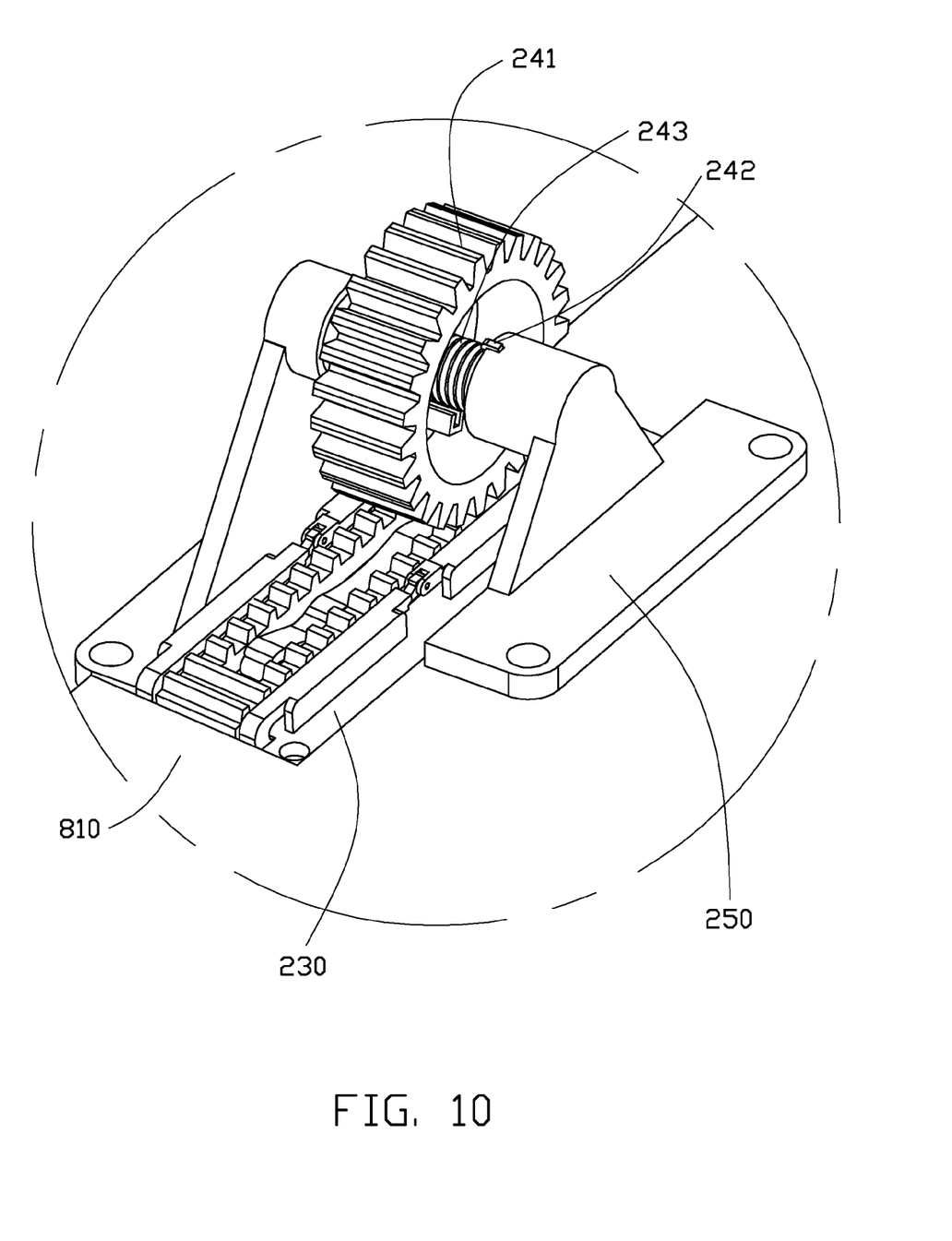
FIG. 10 is an enlarged view of a portion X of FIG. 4.
Figure 11:
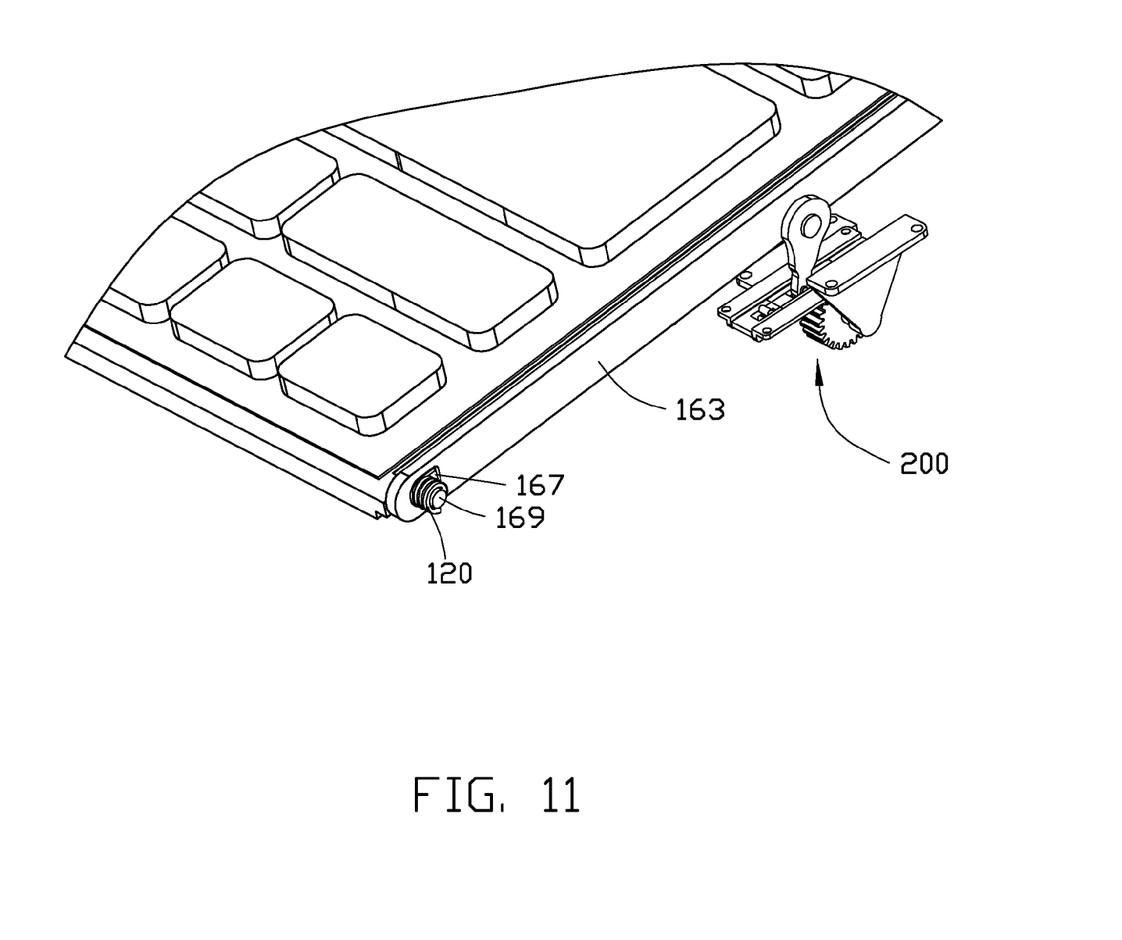
FIG. 11 is a partial view of the electronic device of FIG. 1.
Figure 12:
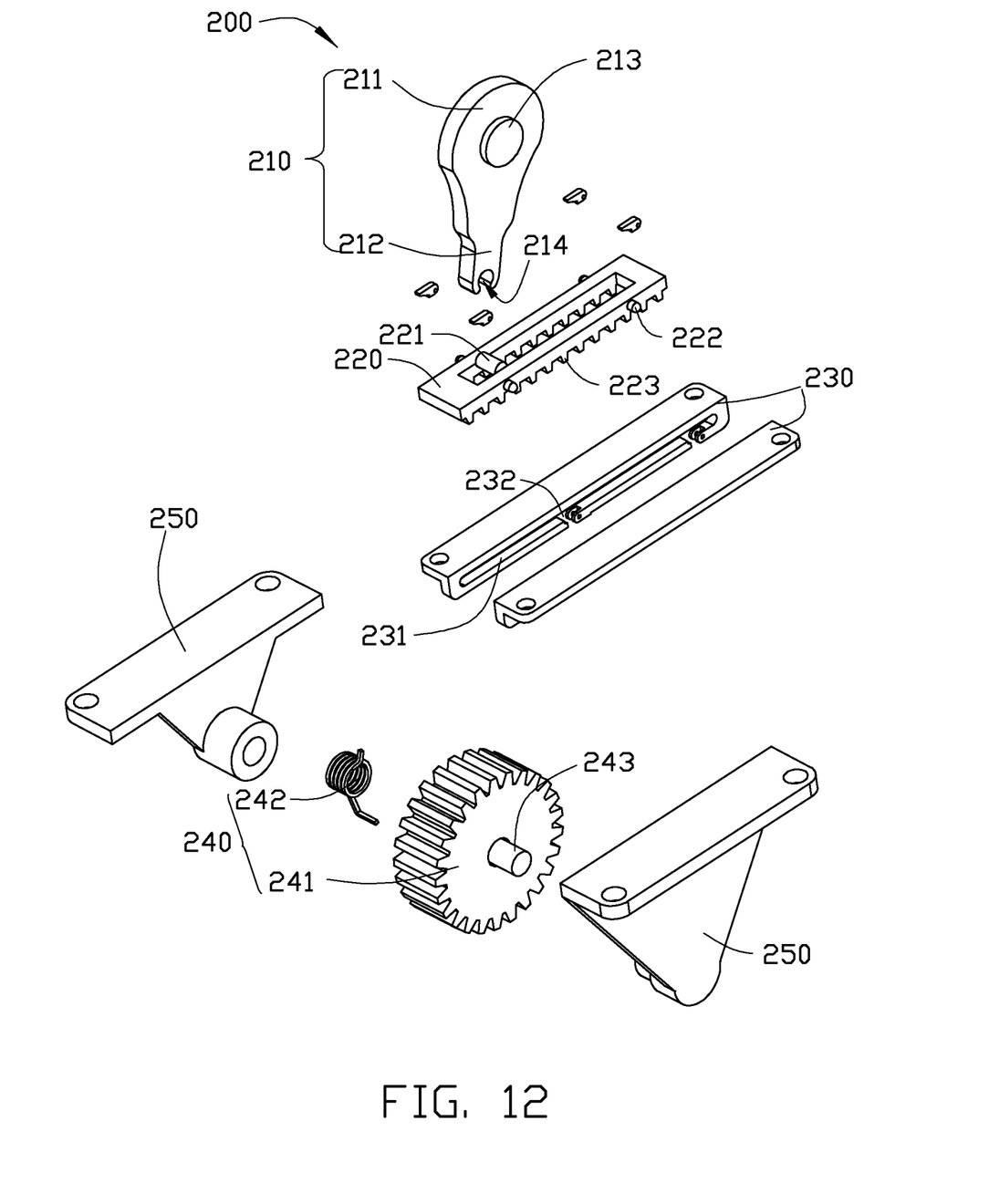
FIG. 12 is an exploded, isometric view of a support mechanism of the electronic device of FIG. 1.

FIGS. 10-12 show that each support mechanism 200 includes a connecting member 210, a slider 220, two rails 230, a second driving device 240, and two brackets 250.

The connecting member 210 includes a first end 211 and an opposite second end 212. The connecting member 210 further includes a third shaft 213 that protrudes from one side and extends through the through slot 817 of the main body 800, and pivotally connected to the first bar 161 or the third bar 163. The second end 212 defines an open-end cutout 214.

The slider 220 includes a fourth shaft 221 fixedly retained within the cutout 214 of the connecting member 210 and four positioning posts 222 protruding from opposite sides thereof. The slider 220 further defines a set of teeth 223 facing the second driving device 240.

The rails 230 and the brackets 250 are mounted to the inner side of the housing 810 of the main body 800. The rails 230 each define a sliding groove 231 and two openings 232 communicating with the sliding groove 231. The positioning posts 222 of the slider 220 enters into the sliding grooves 231 via the openings 232 of the rails 230, and the slider 220 is thus slidable along the sliding groove 231.

The second driving device 240 is used to drive the slider 220 to slide along the sliding groove 231. In the embodiment, the second driving device 240 includes a gear 241 engaging the teeth 223 of the slider 220 and a torsion spring 242. The gear 241 is rotatably connected to the brackets 250 via a second shaft 243. The torsion spring 242 is coiled around the second shaft 243 with opposite ends abutting against one of the brackets 250 and the gear 241.

Figure 13:
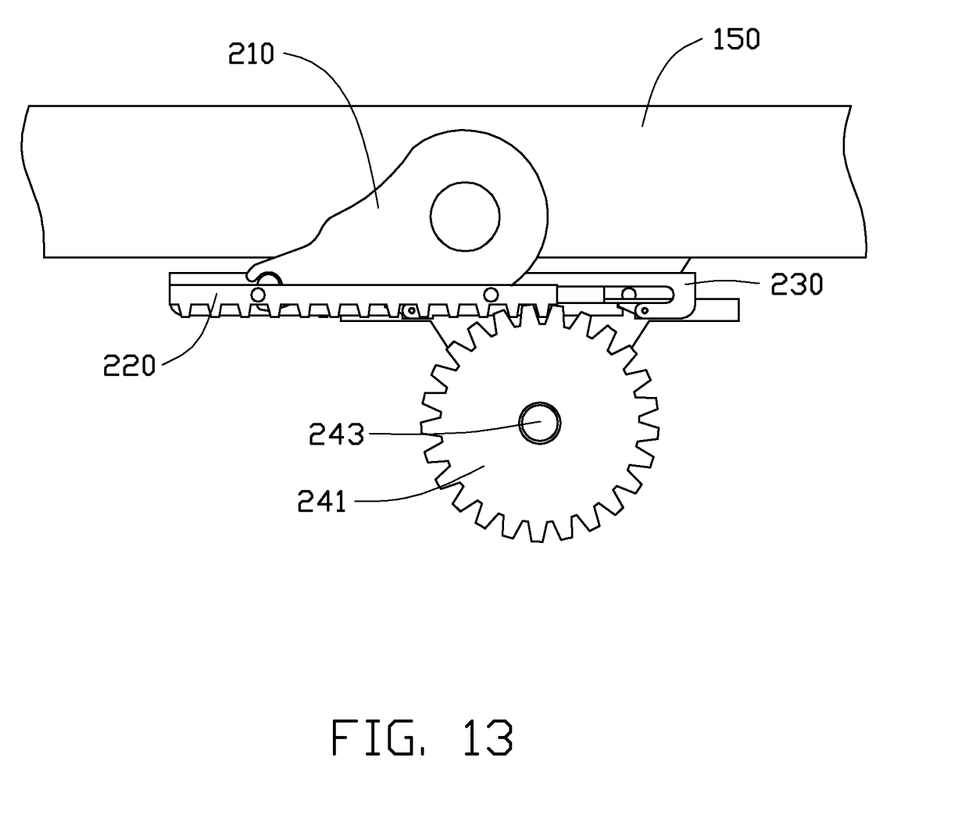
FIGS. 13-14 are side elevation views of the electronic device of FIG. 1.
Figure 14:
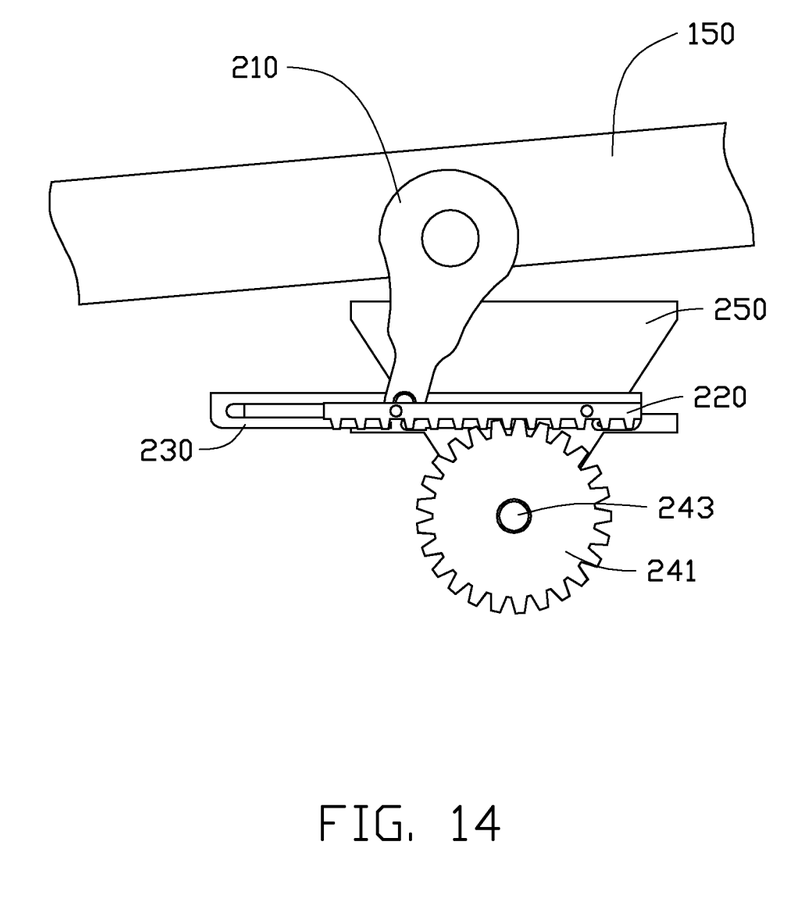

FIGS. 13-14 show that when the fixing assembly 150 is released by the latching mechanism 110, the torsion spring 242 rebounds and drives the gear 241 to rotate, causing the slider 220 to slide along the sliding groove 231. When the fixing assembly 150 and the input device 850 are rotated, as urged by the first driving device 120, to the second position, the connecting member 210 would rotate simultaneously to a give orientation for supporting the fixing assembly 150 and the input device 850, thereby holding the input device 850 steadily at that angle.

In another embodiment, the fixing assembly 150 may be omitted, and the first shafts 169 can be directly formed on opposite sides of the input device 850.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device comprising:
    a main body comprising a housing defining a recess therein;
    an input device rotatably received in the recess, the input device being rotatable between a first position where a top surface of the input device is substantially coplanar with a top surface of the housing, and a second position where the input device is inclined with respect to the top surface of the housing;
    a latching mechanism configured to latch the input device in the first position;
    at least one first driving device configured to rotate the input device to the second position when the input device is released by the latching mechanism; and
    at least one support mechanism configured to support the input device, thereby maintaining the input device in the second position, wherein each of the at least one support mechanism comprises a slider movable connected to the main body and a connecting member comprising a first end pivotally connected to the slider and an opposite second end pivotally connected to the input device.

2. The electronic device as described in claim 1, further comprising a display pivotally connected to the main body.

3. The electronic device as described in claim 1, wherein the input device is a physical keyboard.

4. The electronic device as described in claim 1, wherein the input device is a touch pad.

5. The electronic device as described in claim 1, wherein the latching mechanism comprises a button movably connected to the housing of the main body and a latching member fixed to the button and comprising a latching portion for latching the input device.

6. The electronic device as described in claim 5, wherein the housing of the main body defines a receiving hole therein, the latching member defines an engaging hole, and the button comprises a body movably received in the receiving hole and two hooks extending through a bottom of the receiving hole and detachably engaging opposite edges of the engaging hole of the latching member.

7. The electronic device as described in claim 5, wherein the housing of the main body comprises a stopper protrusion, the latching member comprises a positioning rod, and the latching mechanism further comprises a spring coil coiled around the positioning rod with opposite ends abutting against the stopper protrusion and the latching member, thereby applying a pushing force to the latching member that drives the latching member to a position for latching the input device.

8. The electronic device as described in claim 5, wherein the input device defines a latching hole facing toward the latching member, and the latching portion is insertable into the latching hole for latching the input device.

9. The electronic device as described in claim 1, further comprising a fixing assembly securing the input device, wherein the fixing assembly comprises a base plate supporting the input device and a frame secured to the base plate, and two first shafts are formed on opposite sides of the frame for pivotally connecting the input device to the main body.

10. The electronic device as described in claim 1, wherein the at least one support mechanism further comprises a second driving device configured to drive the slider to slide with respect to the main body.

11. The electronic device as described in claim 10, wherein the slider defines a set of teeth, the second driving device comprises a gear engaged with the teeth of the slider and pivotally connected to the main body via a second shaft, and a second torsion spring coiled around the second shaft with opposite ends abutting against the gear and the main body, and when the input device is released by the latching mechanism, the second torsion spring rebounds and drives the gear to rotate for driving the slider and the first end of the connecting member to move, thereby causing the connecting member to rotate to a given orientation for maintaining the input device in the second position.

12. The electronic device as described in claim 1, wherein when the input device is in the first position, the input device is entirely received in the recess, and when the input device is in the second position, the input device is partially received in the recess.

13. The electronic device as described in claim 1, wherein the at least one first driving device is a torsion spring with opposite ends abutting against the main body and the input device.

14. An electronic device comprising:
a main body comprising a housing defining a recess therein;
an input device rotatably received in the recess, the input device being rotatable between a first position where a top surface of the input device is substantially coplanar with a top surface of the housing, and a second position where the input device is inclined with respect to the top surface of the housing;
a latching mechanism configured to latch the input device in the first position;
at least one first driving device configured to rotate the input device to the second position when the input device is released by the latching mechanism; and
at least one support mechanism comprising a connecting member comprising a first end movably connected to the housing and an opposite second end pivotally connected to the input device, wherein the at least one support mechanism further comprises a slider movably connected to the main body and defining a set of teeth, and a second driving device comprising a gear engaged with the teeth of the slider and pivotally connected to the main body via a second shaft and a second torsion spring coiled around the second shaft with opposite ends abutting against the gear and the main body, and when the input device is released by the latching mechanism, the second torsion spring rebounds and drives the gear to rotate thus driving the slider and the first end of the connecting member to move, thereby causing the connecting member to rotate to a given orientation and maintaining the input device in the second position.

15. The electronic device as described in claim 14, wherein the latching mechanism comprises a button movably connected to the housing of the main body and a latching member fixed to the button and comprising a latching portion for latching the input device.

16. The electronic device as described in claim 15, wherein the housing of the main body defines a receiving hole therein, the latching member defines an engaging hole, and the button comprises a body movably received in the receiving hole and two hooks extending through a bottom of the receiving hole and detachably engaging opposite edges of the engaging hole of the latching member.

17. The electronic device as described in claim 15, wherein the housing of the main body comprises a stopper protrusion, the latching member comprises a positioning rod, and the latching mechanism further comprises a spring coil coiled around the positioning rod with opposite ends abutting against the stopper protrusion and the latching member, thereby applying a pushing force to the latching member that drives the latching member to a position for latching the input device.

18. The electronic device as described in claim 15, wherein the input device defines a latching hole facing toward the latching member, and the latching portion is insertable into the latching hole for latching the input device.

19. An electronic device comprising:
a main body comprising a housing defining a recess and a receiving hole therein;
an input device rotatably received in the recess, the input device being rotatable between a first position where a top surface of the input device is substantially coplanar with a top surface of the housing, and a second position where the input device is inclined with respect to the top surface of the housing;
a latching mechanism configured to latch the input device in the first position, wherein the latching mechanism comprises a button movably connected to the housing of the main body and a latching member defining an engaging hole, the button comprises a body movably received in the receiving hole and two hooks extending through a bottom of the receiving hole and detachably engaging opposite edges of the engaging hole of the latching member;
at least one first driving device configured to rotate the input device to the second position when the input device is released by the latching mechanism; and
at least one support mechanism configured to support the input device, thereby maintaining the input device in the second position.

* * * * *